US009803635B2

(12) United States Patent
Kato et al.

(10) Patent No.: US 9,803,635 B2
(45) Date of Patent: Oct. 31, 2017

(54) HIGH PRESSURE PUMP

(71) Applicant: DENSO CORPORATION, Kariya, Aichi-pref. (JP)

(72) Inventors: Takehiko Kato, Nukata-gun (JP); Shinichiro Koshimoto, Kariya (JP); Osamu Hishinuma, Toyota (JP); Yutaka Miyamoto, Takahama (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/386,177

(22) Filed: Dec. 21, 2016

(65) Prior Publication Data

US 2017/0101987 A1 Apr. 13, 2017

Related U.S. Application Data

(63) Continuation of application No. 14/284,823, filed on May 22, 2014.

(30) Foreign Application Priority Data

May 24, 2013 (JP) .................................. 2013-109738

(51) Int. Cl.
| | |
|---|---|
| F04B 53/10 | (2006.01) |
| F16K 1/32 | (2006.01) |
| F02M 59/46 | (2006.01) |
| F04B 19/22 | (2006.01) |
| F04B 19/04 | (2006.01) |
| F02M 59/02 | (2006.01) |
| F04B 53/14 | (2006.01) |
| F04B 53/16 | (2006.01) |

(52) U.S. Cl.
CPC ....... *F04B 53/1085* (2013.01); *F02M 59/025* (2013.01); *F04B 19/04* (2013.01); *F04B 19/22* (2013.01); *F04B 53/1087* (2013.01); *F04B 53/14* (2013.01); *F04B 53/16* (2013.01); *F16K 1/32* (2013.01)

(58) Field of Classification Search
CPC ..... F16K 1/00; F16K 1/36; F16K 1/32; F16K 31/06; F04B 53/1085; F04B 53/1087; F04B 53/14; F04B 53/16; F04B 1/0452; F04B 19/22; F04B 19/04; F02M 63/0075; F02M 63/0077; F02M 63/0078
USPC ........ 137/512.1, 512.2, 512.5, 538; 417/298, 417/559, 46; 251/359
See application file for complete search history.

(56) References Cited

U.S. PATENT DOCUMENTS

| | | | |
|---|---|---|---|
| 6,895,936 B2 | 5/2005 | Kuroda | |
| 7,225,830 B1 | 6/2007 | Kershaw | |
| 8,616,523 B2 * | 12/2013 | Duerr | ................. F04B 53/1082 137/516.13 |
| 9,528,609 B2 * | 12/2016 | Kuroyanagi | ....... F02M 63/0077 |

(Continued)

Primary Examiner — Nathan Zollinger
(74) Attorney, Agent, or Firm — Nixon & Vanderhye P.C.

(57) ABSTRACT

A valve seat member, which partitions between a supply passage and a pressurizing chamber, includes an inner flow path, which communicates between the supply passage and the pressurizing chamber, and an outer flow path, which is placed on a radially outer side of the inner flow path. An inner valve is seatable against an inner valve seat formed in an opening of the inner flow path. An outer valve is contactable with an end surface of the inner valve, which is opposite from the inner valve seat. The outer valve is seatable against an outer valve seat, which is formed in an opening of the outer flow path.

6 Claims, 16 Drawing Sheets

(56) References Cited

U.S. PATENT DOCUMENTS

2010/0166584 A1 7/2010 Fukui et al.
2012/0288389 A1 11/2012 Kuroyanagi et al.

* cited by examiner

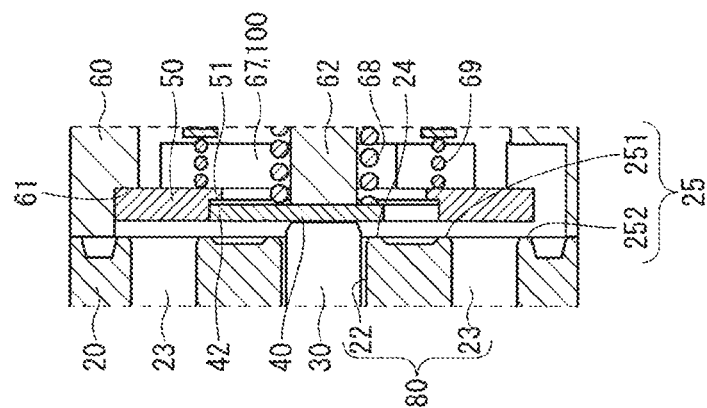
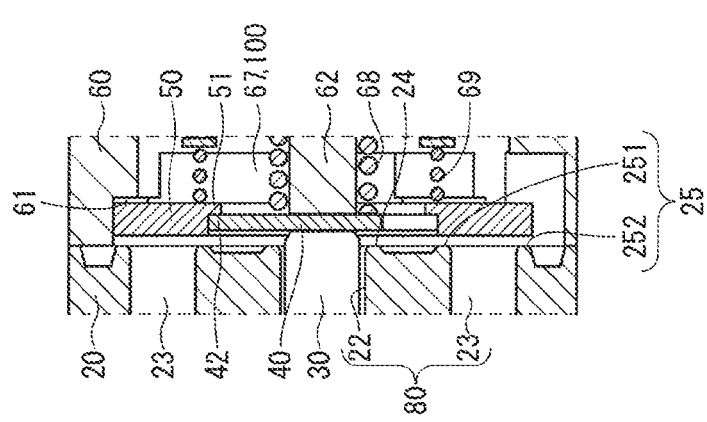
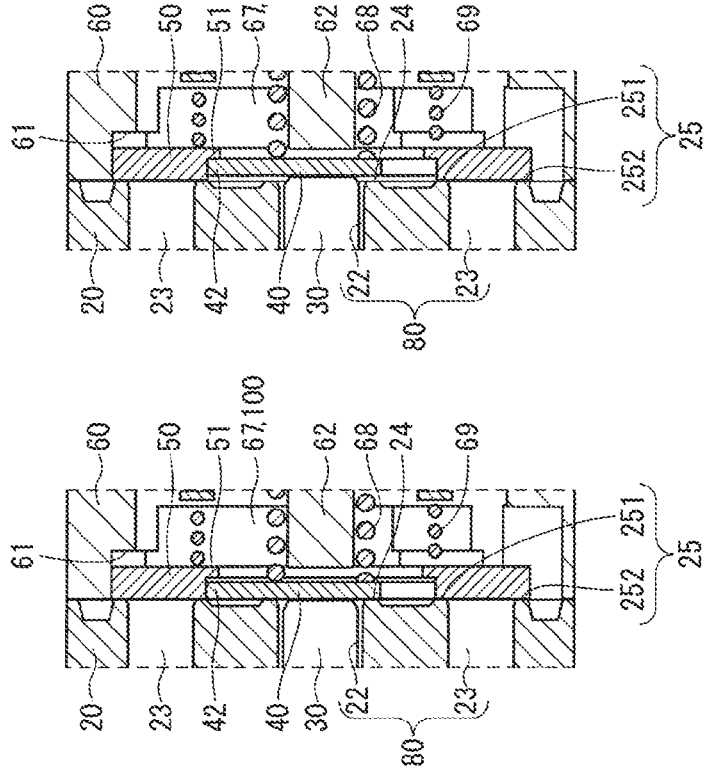
FIG. 7A   FIG. 7B   FIG. 7C   FIG. 7D

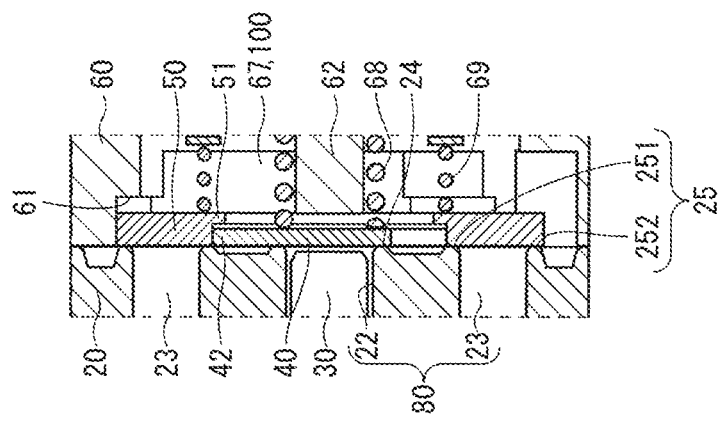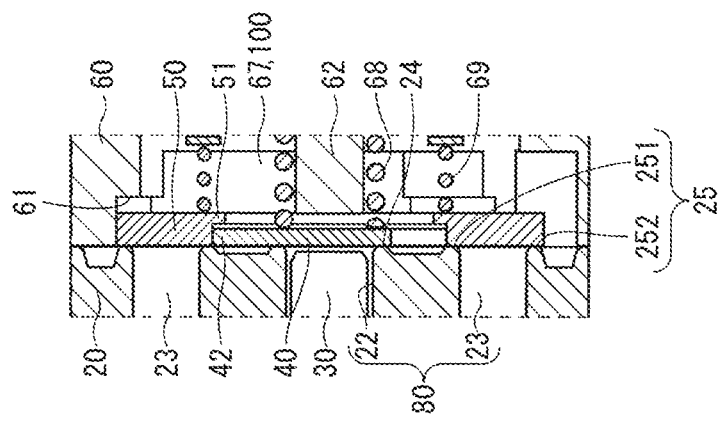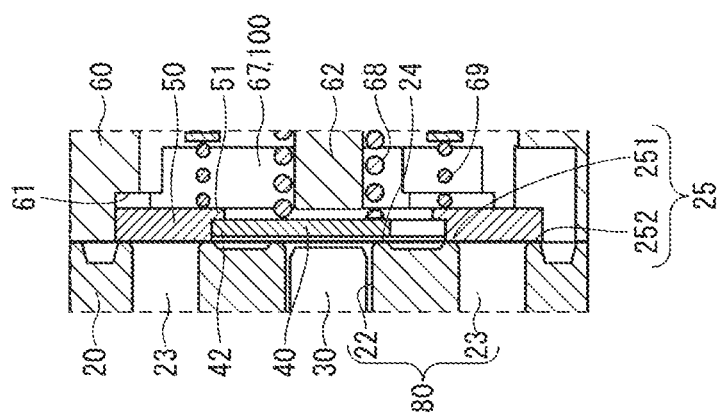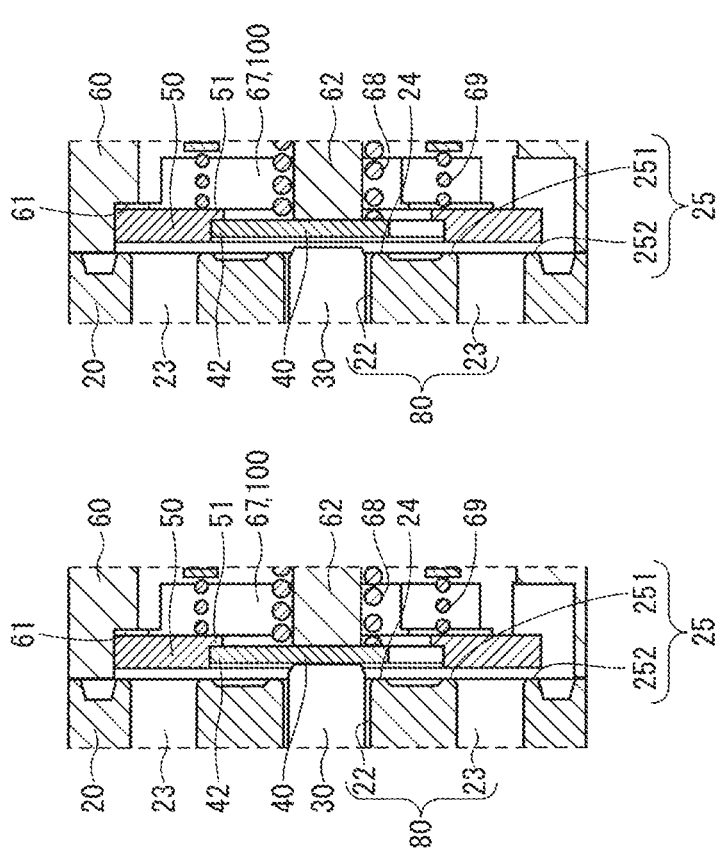

HIGH PRESSURE PUMP

CROSS REFERENCE TO RELATED APPLICATION

This application is a continuation of U.S. application Ser. No. 14/284,823, filed May 22, 2014, which is based on Japanese Patent Applications No. 2013-109738, filed on May 24, 2013, the disclosures of which are incorporated herein by reference.

TECHNICAL FIELD

The present disclosure relates to a high pressure pump.

BACKGROUND

A high pressure pump, which pressurizes fuel to be supplied to an internal combustion engine, is known. The high pressure pump pressurizes the fuel, which is supplied from a supply passage to a pressurizing chamber. Thereafter, the high pressure pump discharges the pressurized fuel, which is pressurized in the pressurizing chamber, through a discharge passage.

For instance, JP2012-251658A (corresponding to US2012/0288389A1) discloses such a high pressure pump, which includes an inner flow path and an outer flow path. The inner flow path is formed in a valve seat member, which partitions between a supply passage and a pressurizing chamber. The outer flow path is configured into an annular form and is placed on a radially outer side of the inner flow path. In this way, a passage cross-sectional area (an opening area) of the entire flow path, which communicates between the supply passage and the pressurizing chamber, is increased. Thus, a required lift amount (i.e., a required amount of lift) of a valve element, which is required to ensure the required amount of the flow to be supplied to the pressurizing chamber, can be reduced. Thereby, the acceleration of the valve element at a valve opening time or a valve closing time thereof is reduced, and a collision speed of the valve element against the valve seat or a stopper is reduced. Thus, the collision impact force of the valve element against the valve seat or the stopper is reduced, and the vibration conducted to a surrounding area, which is located around the valve seat or the stopper, is reduced. Thus, the noise, which is outputted from the high pressure pump to the outside, is reduced.

However, in the high pressure pump of JP2012-251658A (corresponding to US2012/0288389A1), the valve seat, which is formed in the inner flow path, and the valve seat, which is formed in the outer flow path, are opened and closed by the single valve element. Therefore, in a case where the valve seat of the inner flow path and the valve seat of the outer flow path are no longer present in a common plane due to, for example, wearing that is induced by a temperature change of the high pressure pump or an increase in the number of operations of the high pressure pump, a small gap may possibly be formed between the valve seat of the inner flow path and the valve element or between the valve seat of the outer flow path and the valve element. When the pressurized fuel, which is pressurized in the pressurizing chamber, is leaked to the supply passage through this gap, the pump efficiency of the high pressure pump may possibly be deteriorated. Furthermore, when the small gap is formed between the valve seat and the valve element, cavitation may possibly occur in the high pressure fuel conducted through the gap, and this cavitation may possibly cause erosion of the valve seat and the valve element.

SUMMARY

The present disclosure addresses the above disadvantages.

According to the present disclosure, there is provided a high pressure pump, which includes a plunger, a pump body, a valve seat member, an inner valve, an outer valve, a rod, and at least one movement limiting device. The plunger is reciprocatable. The pump body includes a pressurizing chamber, in which fuel is pressurized through reciprocation of the plunger, and a supply passage, which supplies the fuel to the pressurizing chamber. The valve seat member partitions between the supply passage and the pressurizing chamber. The valve seat member includes an inner flow path, which communicates between the supply passage and the pressurizing chamber, and an outer flow path, which is placed on a radially outer side of the inner flow path and communicates between the supply passage and the pressurizing chamber. The inner valve is seatable and is liftable relative to an inner valve seat, which is formed in an opening of the inner flow path. The outer valve is contactable with an end surface of the inner valve, which is opposite from the inner valve seat. The outer valve is seatable and is liftable relative to an outer valve seat, which is formed in an opening of the outer flow path. The rod is received through the inner flow path of the valve seat member and controls movement of the inner valve and movement of the outer valve. The at least one movement limiting device limits a lift amount of the inner valve from the inner valve seat and a lift amount of the outer valve from the outer valve seat.

BRIEF DESCRIPTION OF THE DRAWINGS

The drawings described herein are for illustration purposes only and are not intended to limit the scope of the present disclosure in any way.

FIGS. 7A to 7D are descriptive views, showing various operational states from valve closed states of the inner valve and the outer valve to valve open states of the inner valve and the outer valve in the first embodiment;

FIGS. 8A to 8D are descriptive views, showing various operational states from the valve open states of the inner valve and the outer valve to the valve closed states of the inner valve and the outer valve in the first embodiment;

DETAILED DESCRIPTION

Various embodiments of the present disclosure will be described with reference to the accompanying drawings.

First Embodiment

FIGS. 1 to 8D show a high pressure pump according to a first embodiment of the present disclosure. The high pressure pump 1 pressurizes fuel, which is pumped by a low pressure pump from a fuel tank (not shown), and the high pressure pump 1 discharges the pressurized fuel to a delivery pipe. The fuel, which is accumulated in the delivery pipe, is injected into each corresponding cylinder of an internal combustion engine from a corresponding injector connected to the delivery pipe.

Figure 1:
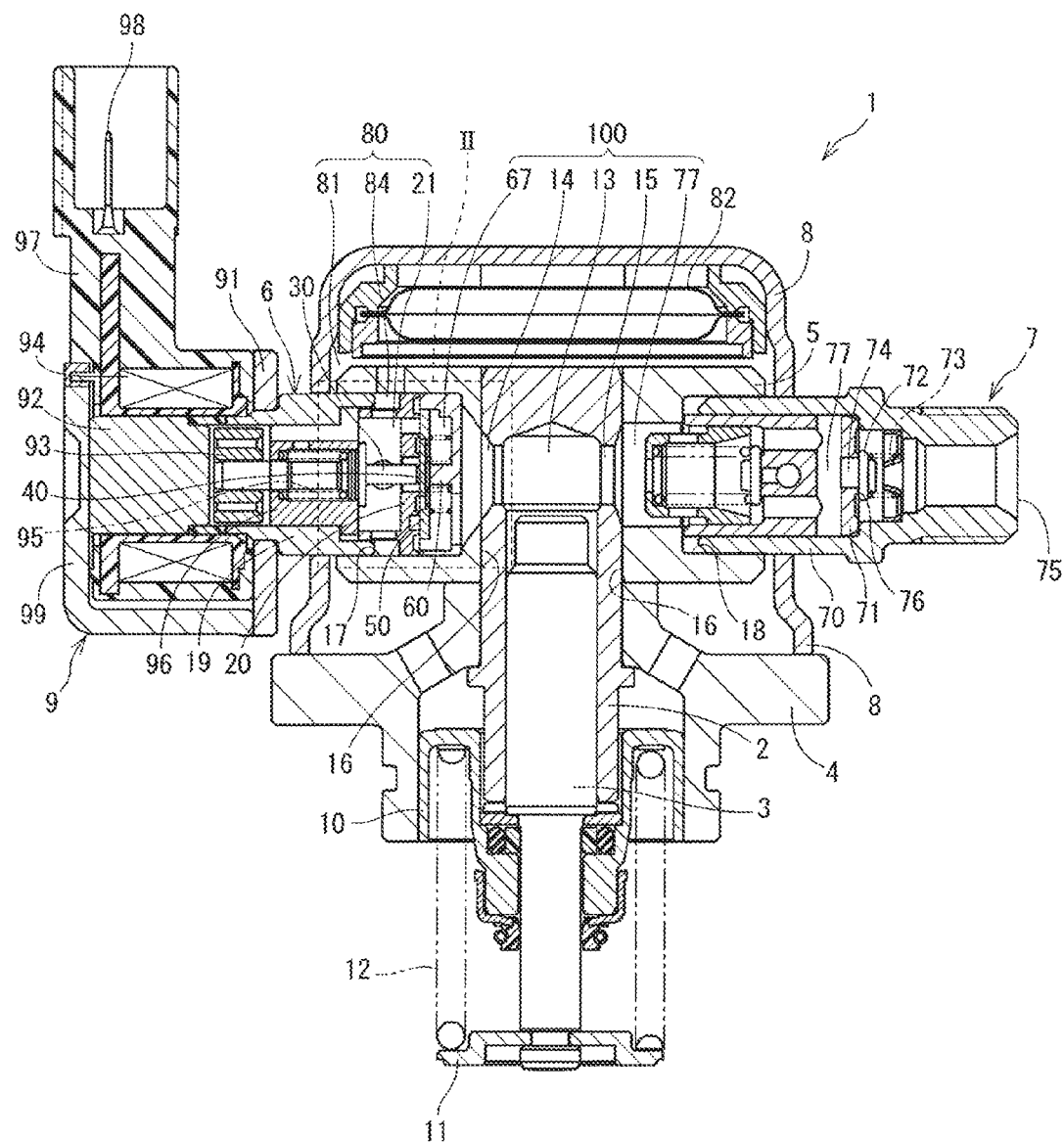
FIG. 1 is a cross-sectional view of a high pressure pump according to a first embodiment of the present disclosure.

As shown in FIG. 1, the high pressure pump 1 includes a cylinder 2, a plunger 3, a lower housing 4, an upper housing 5, a fuel supply arrangement 6, a fuel discharge arrangement 7, a cover 8, and a solenoid drive arrangement 9.

The cylinder 2 and the upper housing 5 serve as a pump body of the present disclosure.

The cylinder 2 is configured into a tubular form and reciprocatably receives the plunger 3. The lower housing 4 and the upper housing 5 are fixed to an outer peripheral surface of the cylinder 2. The lower housing 4 is installable to an installation hole, which is formed in the internal combustion engine (not shown).

A spring 12 is placed between an oil seal holder 10, which is fixed to the lower housing 4, and a spring seat 11, which is fixed to a lower end part of the plunger 3. The spring 12 urges the plunger 3 against a camshaft of the internal combustion engine (not shown). Therefore, the plunger 3 can reciprocate in the axial direction according to a cam profile of the camshaft.

A pump chamber 13 is formed between an upper end part of the plunger 3 and an inner wall of the cylinder 2. The cylinder 2 has an intake hole 14 and a discharge hole 15. The intake hole 14 opens from the pump chamber 13 in one radial direction, and the discharge hole 15 opens from the pump chamber 13 in an opposite radial direction, which is opposite from the one radial direction.

The upper housing 5 is configured into a generally cuboid form. A hole 16, which is formed in a center part of the upper housing 5, is fluid tightly coupled to the cylinder 2, and the upper housing 5 is fixed to the cylinder 2 on an upper side of the lower housing 4. The upper housing 5 includes a fuel supply arrangement installation hole 17 and a fuel discharge arrangement installation hole 18. The fuel supply arrangement installation hole 17 is communicated with the intake hole 14 of the cylinder 2, and the fuel discharge arrangement installation hole 18 is communicated with the discharge hole 15 of the cylinder 2.

The fuel supply arrangement 6 includes a supply valve body 19, a valve seat member 20, a rod 30, an inner valve 40, an outer valve 50, and a stopper member 60. The fuel supply arrangement 6 will be discussed later in detail.

The fuel discharge arrangement 7 includes a discharge valve body 70, a discharge valve seat member 71, a discharge valve 72, and a spring 73.

The discharge valve body 70 is configured into a tubular form and is fixed to the fuel discharge arrangement installation hole 18. The discharge valve seat member 71 is fixed in an inside of the discharge valve body 70. The discharge valve seat member 71 includes a flow path 74 and a discharge valve seat 76. The discharge valve seat 76 is formed at an opening of the flow path 74, which is located on a side where a fuel outlet 75 is located. The discharge valve 72 is seatable and liftable relative to the discharge valve seat 76. The spring 73 urges the discharge valve 72 against the discharge valve seat 76.

The cover 8 is configured into a cup shape form, and an opening end of the cover 8 is fluid-tightly fixed to the lower housing 4. A fuel gallery 81, which is filled with the fuel, is formed in an inside of the cover 8. A fuel inlet (not shown) is formed in the cover 8. The fuel, which is pumped from the fuel tank (not shown), is supplied to the fuel inlet. Therefore, the fuel is supplied from the fuel inlet to the fuel gallery 81.

A pulsation damper 82 is fixed to an inside of the cover 8. A gas of a predetermined pressure is sealed in the inside of the pulsation damper 82. The pulsation damper 82 is resiliently deformed in response to pressure pulsation of the fuel in the fuel gallery 81 to damp the pressure pulsation of the fuel.

The solenoid drive arrangement 9 includes a flange 91, a stationary core 92, a movable core 93, a coil 94, and a first spring 95.

The flange 91 is fixed to an outer wall of the supply valve body 19, which is configured into a tubular form and is fixed to the fuel supply arrangement installation hole 17 of the upper housing 5. The movable core 93 is reciprocatably placed in an inside of the supply valve body 19. The rod 30 is fixed to a center part of the movable core 93. A guide member 96, which is fixed to an inside of the supply valve body 19, is axially reciprocatably supports the rod 30. The first spring 95 urges the movable core 93 and the rod 30 toward the pump chamber 13.

The stationary core 92 is placed on a side of the movable core 93, which is opposite from the pump chamber 13, and the coil 94 is placed on a radially outer side of the stationary core 92. When an electric power is supplied to the coil 94 through a terminal 98 of the connector 97, a magnetic flux flows through a magnetic circuit that is formed by the movable core 93, the stationary core 92, the flange 91, and the yoke 99, and the movable core 93 and the rod 30 are magnetically attracted toward the stationary core 92 against the urging force of the first spring 95.

In contrast, when the supply of the electric power to the coil 94 is stopped, the magnetic flux, which flows through the magnetic circuit discussed above, is lost, and the movable core 93 and the rod 30 are urged by the first spring 95 toward the pump chamber 13.

Next, the fuel supply arrangement 6 will be described with reference to FIGS. 2 to 6.

The valve seat member 20 is fixed to an inner wall of the fuel supply arrangement installation hole 17 on a side of the supply valve body 19 where the cylinder 2 is located. A fuel space 21, which is formed in an inside of the valve seat member 20, is communicated with the fuel gallery 81 through a hole 84, which is formed in the upper housing 5.

The valve seat member 20 includes an inner flow path 22 and an outer flow path 23. The inner flow path 22 is formed generally in a center part of the valve seat member 20. The rod 30 is received through a center part of the inner flow path 22.

An inner valve seat 24 is formed in an opening of the inner flow path 22, which is located on a side where the cylinder 2 is placed. The inner valve seat 24 extends in a plane that is perpendicular to the inner flow path 22, and the inner valve 40 is seatable or liftable relative to the inner valve seat 24.

Figure 2:
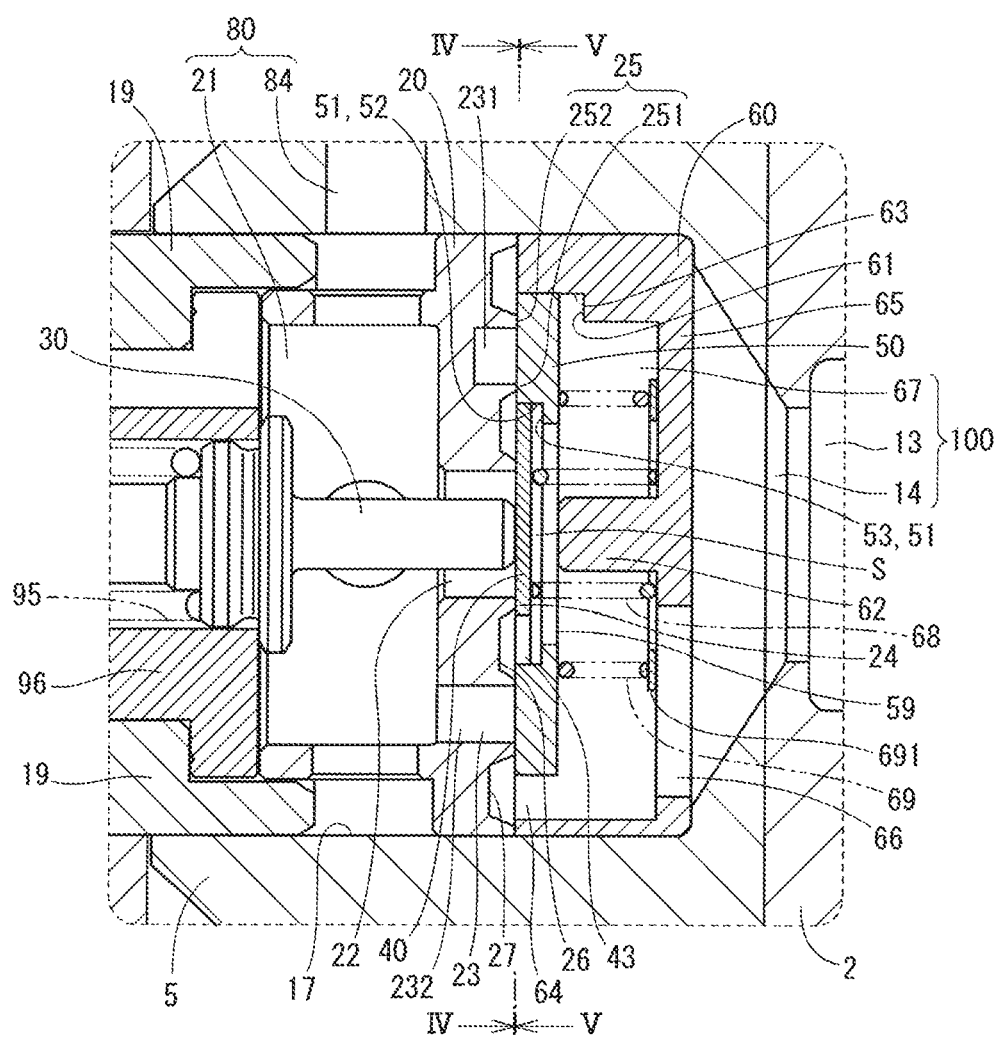
FIG. 2 is a partial cross-sectional view of the high pressure pump at an area II in FIG. 1.
Figure 5:
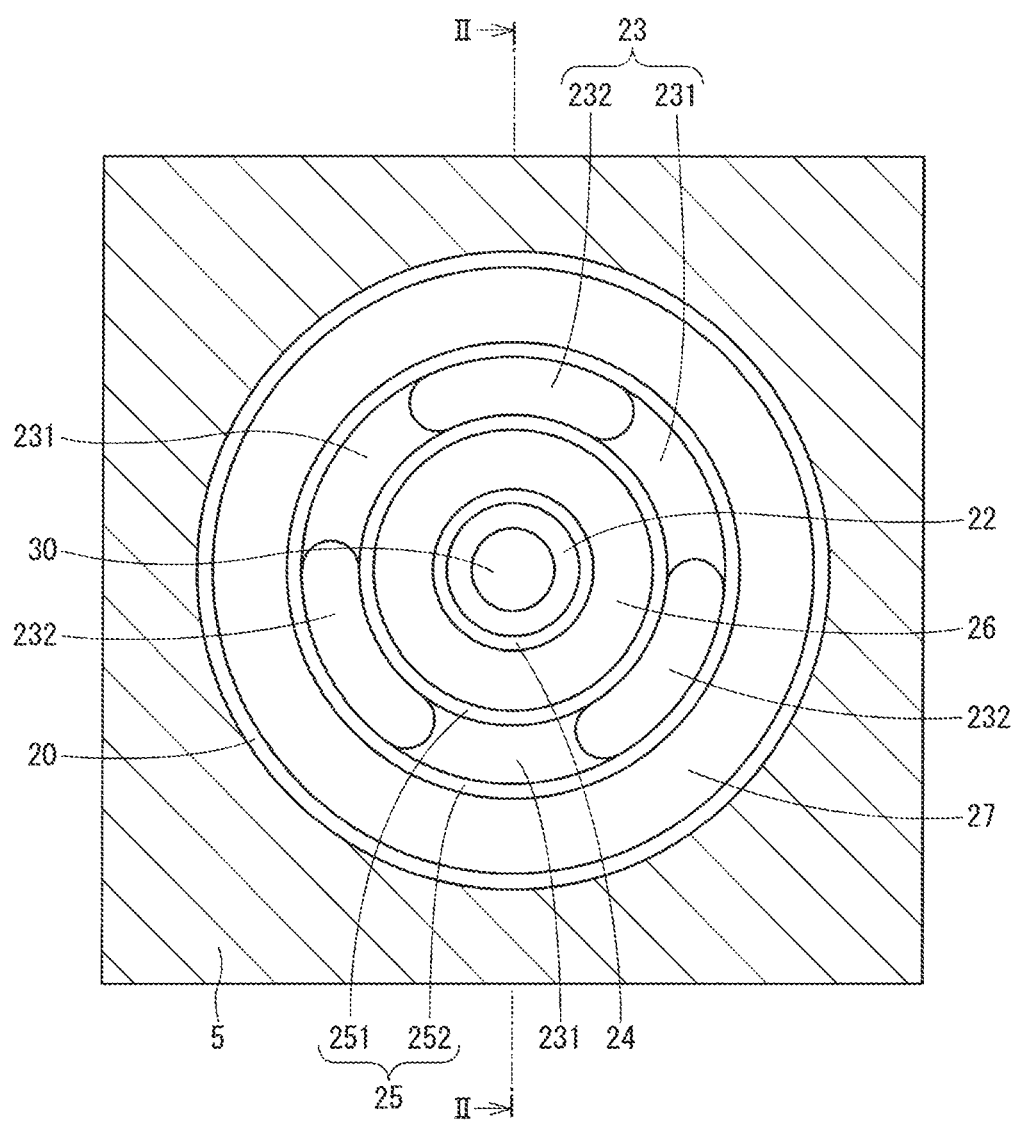
FIG. 5 is a cross-sectional view taken along line V-V in FIG. 2.

As shown in FIGS. 2 and 5, the outer flow path 23 includes a recessed groove 231 and a plurality of through-holes 232. The recessed groove 231 is annular and is located on a radially outer side of the inner flow path 22, and the through-holes 232 communicate between the recessed groove 231 and the fuel space 21.

An outer valve seat 25 is formed in an opening of the recessed groove 231, which is located on a side where the cylinder 2 is placed. The outer valve seat 25 extends in a plane, which is perpendicular to the outer flow path 23, and the outer valve 50 is seatable or liftable relative to the outer valve seat 25. The outer valve seat 25 includes a first outer valve seat 251 and a second outer valve seat 252. The first outer valve seat 251 is placed on a radially inner side of the recessed groove 231. The second outer valve seat 252 is formed on a radially outer side of the recessed groove 231.

In the present embodiment, the inner valve seat 24 and the outer valve seat 25 extends along the common plane.

The fuel space 21, the hole 84 of the upper housing 5, and the fuel gallery 81 of the present embodiment serve as a supply passage 80 of the present disclosure. Furthermore, a space, which extends from the inner valve seat 24 and the outer valve seat 25 to the discharge valve seat 76 of the discharge valve seat member 71 through the pump chamber 13, serves as a pressurizing chamber 100 of the present disclosure (see FIG. 1). The pressurizing chamber 100 is a space, in which the fuel is pressurized through the reciprocation of the plunger 3. The valve seat member 20 partitions between the supply passage 80 and the pressurizing chamber 100.

Furthermore, the valve seat member 20 includes an intermediate groove 26, which is configured into an annular form and is placed between the inner valve seat 24 and the first outer valve seat 251. Furthermore, the valve seat member 20 includes an outer groove 27, which is configured into an annular form and is located on a radially outer side of the second outer valve seat 252.

Figure 4:
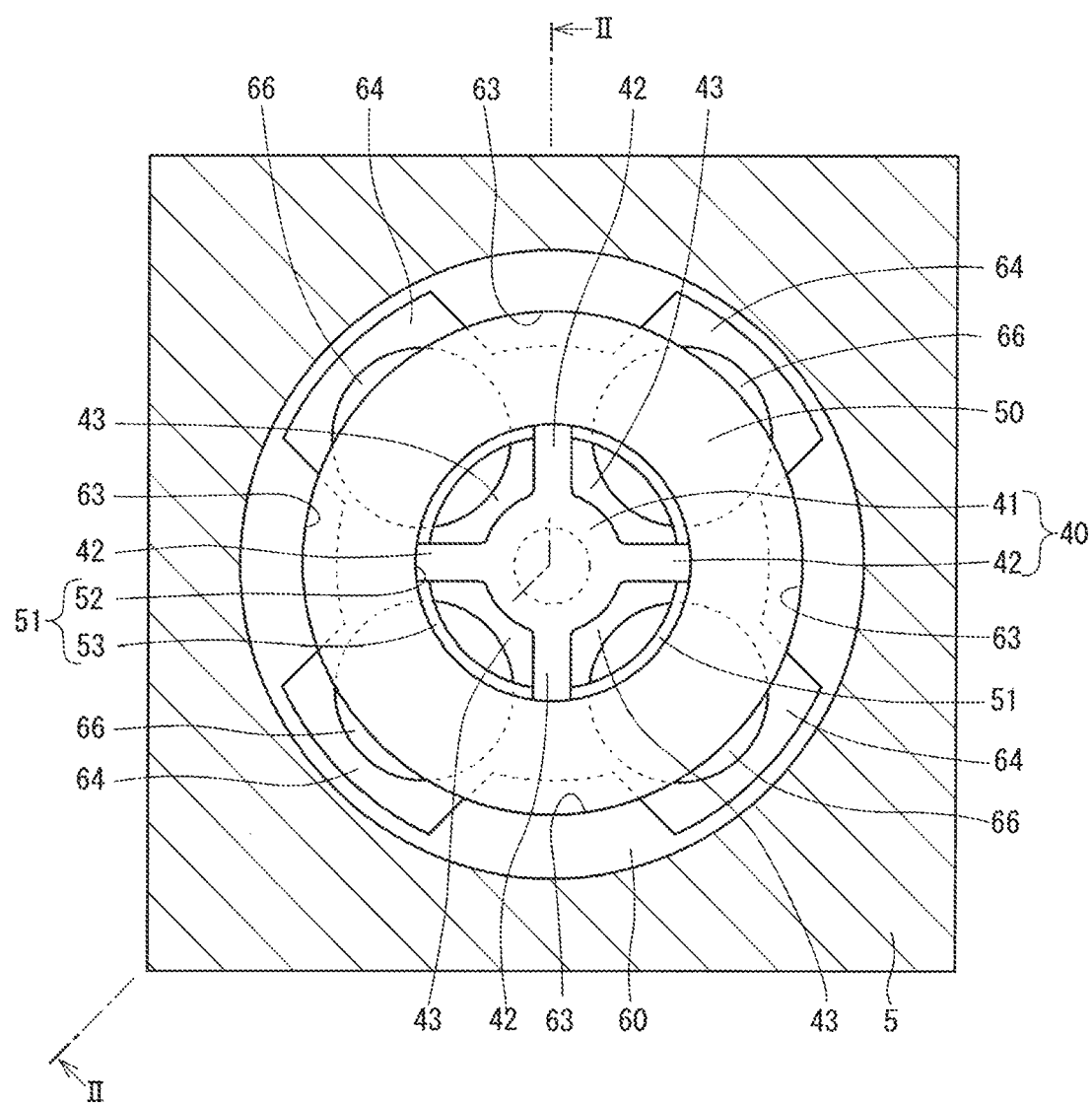
FIG. 4 is a cross-sectional view taken along line IV-IV in FIG. 2.
Figure 6:
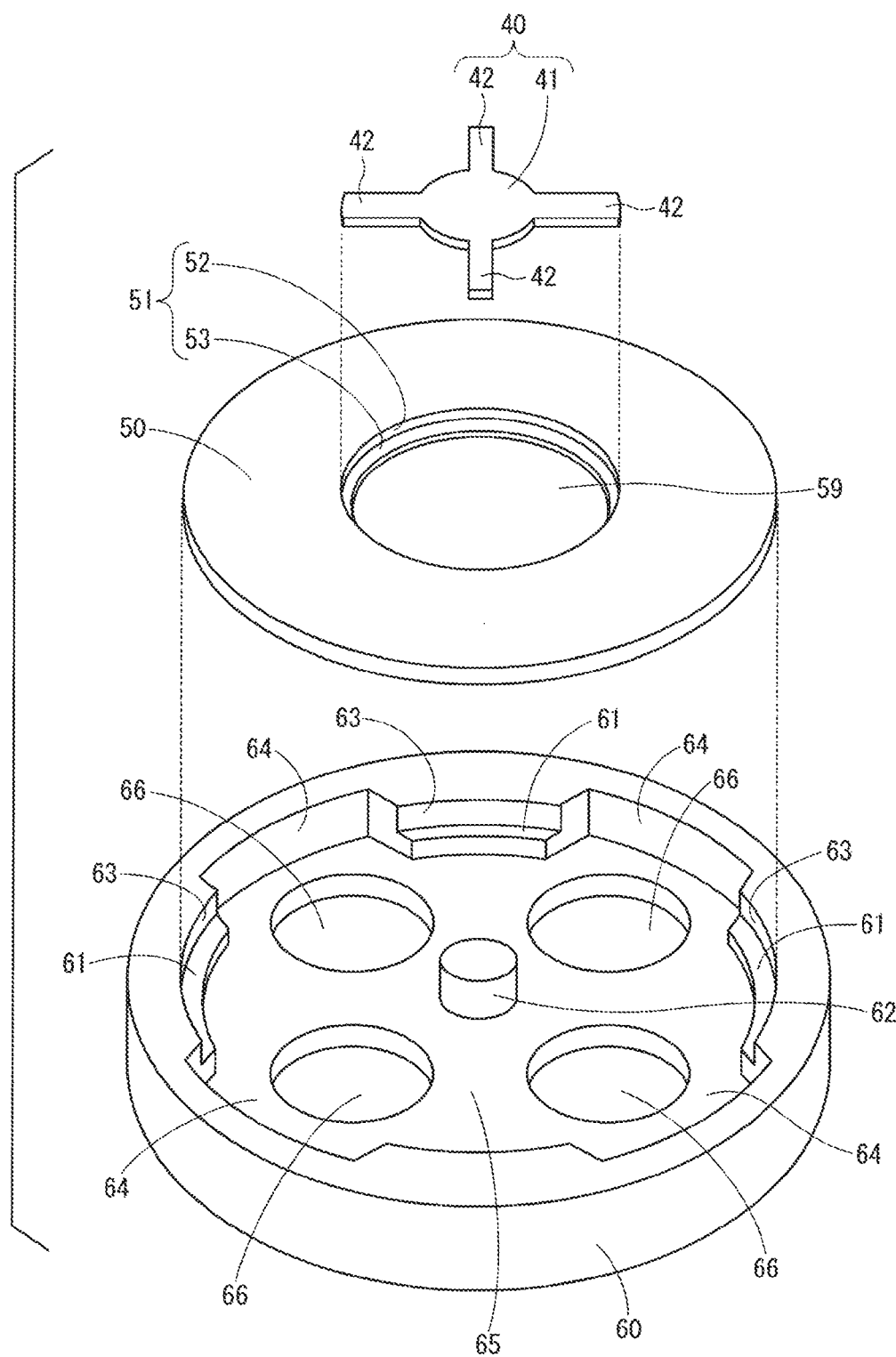
FIG. 6 is a perspective exploded view of the inner valve, the outer valve and a stopper member of the high pressure pump according to the first embodiment.

As shown in FIGS. 4 and 6, the inner valve 40 includes an inner valve main body 41 and a plurality of inner arm portions 42. The inner valve main body 41 closes the inner flow path 22 when the inner valve main body 41 is seated against the inner valve seat 24. The inner arm portions 42 radially outwardly extend from the inner valve main body 41. A flow path 43, which conducts the fuel, is formed between each adjacent two of the inner arm portions 42, which are adjacent to each other in a circumferential direction of the inner valve 40.

The outer valve 50 is configured into an annular form and includes a flow path 59 in an inside of the outer valve 50. The outer valve 50 closes the outer flow path 23 when the outer valve 50 is seated against the outer valve seat 25. The outer valve 50 includes a step 51, which is formed in a radially inner end surface of the outer valve 50 and is recessed toward a side where the pump chamber 13 is located. The inner arm portions 42 are received in an inside of the step 51 of the outer valve 50. The inner arm portions 42 of the inner valve 40 are guided by a radially inner wall 52 of the step 51. The inner arm portions 42 of the inner valve 40 are contactable with a bottom 53 of the step 51.

As shown in FIG. 2, when the inner valve 40 and the outer valve 50 are seated against the inner valve seat 24 and the outer valve seat 25, respectively, a gap S is formed between the bottom 53 of the step 51 of the outer valve 50 and the respective inner arm portions 42 of the inner valve 40. The gap S is larger than an expected amount of deformation of the inner valve seat 24 or the outer valve seat 25, which is made by, for example, wearing that is induced by a temperature change of the high pressure pump 1 or an increase in the number of operations of the high pressure pump 1. Therefore, even in a case where the position of the inner valve seat 24 or the position of the outer valve seat 25 is changed, the inner valve 40 can be seated against the inner valve seat 24 to close the inner flow path 22, and the outer valve 50 can be seated against the outer valve seat 25 to close the outer flow path 23.

The stopper member 60 is placed on a side of the valve seat member 20 where the pump chamber 13 is placed. The stopper member 60 includes an outer stopper 61 and an inner stopper 62. In the stopper member 60, the outer stopper 61 is placed at a radially outer side, and the inner stopper 62 extends from a bottom wall of the stopper member 60 at a center part of the stopper member 60. In the present embodiment, the outer stopper 61 and the inner stopper 62 serve as a movement limiting device of the present disclosure.

The outer stopper 61 is contactable with an end surface of the outer valve 50, which is located on a side where the pump chamber 13 is placed. The outer stopper 61 limits a lift amount of the outer valve 50 from the outer valve seat 25 at a valve opening time of the outer valve 50 (i.e., a time of opening the outer valve 50). The inner stopper 62 is contactable with an end surface of the inner valve 40, which is located on a side where the pump chamber 13 is placed. The inner stopper 62 limits a lift amount of the inner valve 40 from the inner valve seat 24 at a valve opening time of the inner valve 40 (i.e., a time of opening the inner valve 40). The inner stopper 62 and the rod 30 are opposed to each other while the inner valve 40 is interposed between the inner stopper 62 and the rod 30.

The stopper member 60 includes a plurality of guide surfaces 63, which are arranged one after another in a circumferential direction and axially guide an outer peripheral wall (a radially outer wall) of the outer valve 50. In the stopper member 60, a flow path 64 is formed between each adjacent two of the guide surfaces 63.

Furthermore, the stopper member 60 includes a plurality of communication passages 66, which are formed in a bottom wall 65 of the stopper member 60. The communication passages 66 communicate between a space 67, which is formed in an inside of the stopper member 60, and the pump chamber 13.

A second spring 68 is placed between the bottom wall 65 of the stopper member 60 and the inner valve 40.

The second spring 68 urges the inner valve 40 against the inner valve seat 24.

A base 691 and a third spring 69 are placed between the bottom wall 65 of the stopper member 60 and the outer valve 50. The third spring 69 urges the outer valve 50 against the outer valve seat 25. A sum of an urging force of the second spring 68 and an urging force of the third spring 69 is smaller than an urging force of the first spring 95.

Figure 3:
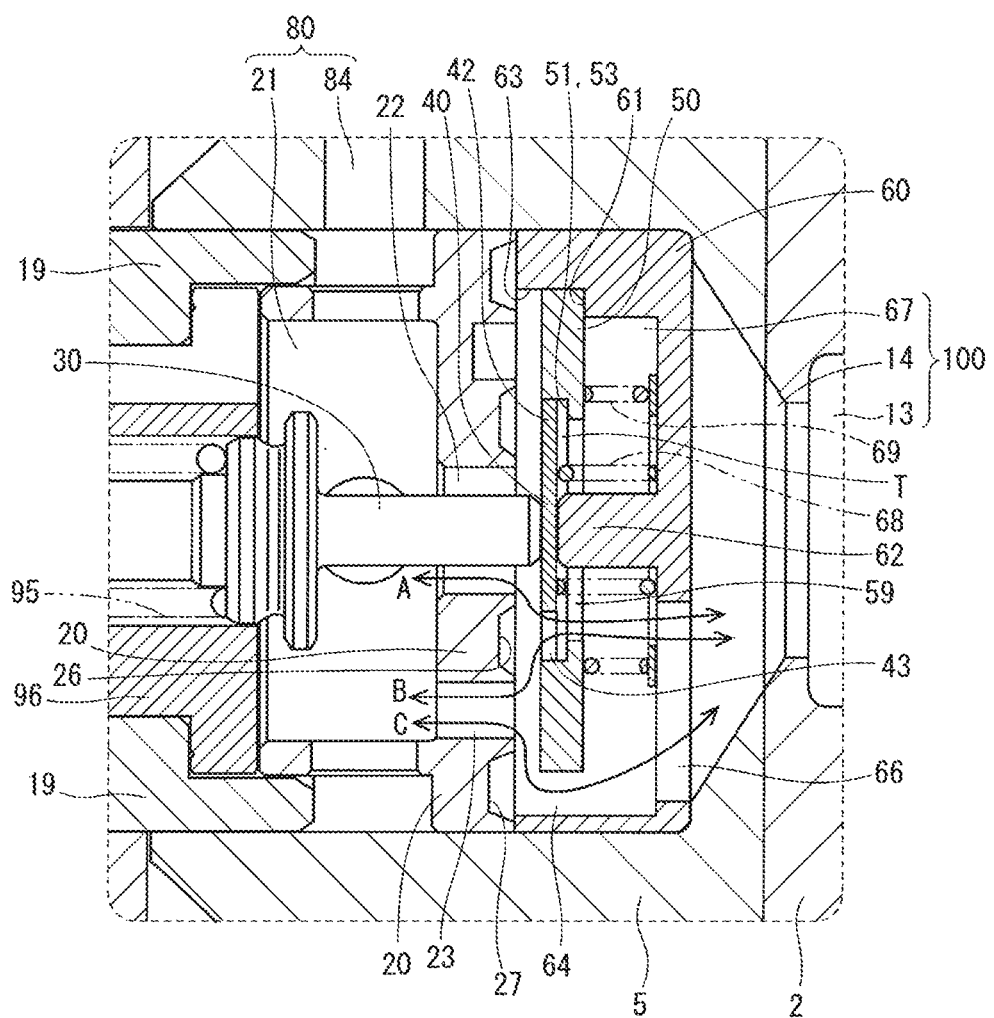
FIG. 3 is a cross-sectional view of a main feature of the high pressure pump of the first embodiment, showing a valve open state of an inner valve and a valve open state of an outer valve.

As shown in FIG. 3, in the state where the inner valve 40 and the outer valve 50 contact the inner stopper 62 and the outer stopper 61, respectively, three flow paths, which conduct the fuel, are formed. In FIG. 3, these three flow paths are indicated by arrows A, B, C, respectively.

The flow path, which is indicated by the arrow A, is formed by the inner flow path 22, the flow path 43 between the outer valve 50 and the inner valve 40, and the flow path 59 at the radially inner side of the outer valve 50.

The flow path, which is indicated by the arrow B, is formed by the outer flow path 23, the flow path 43 between the outer valve 50 and the inner valve 40, and the flow path 59 at the radially inner side of the outer valve 50.

The flow path, which is indicated by the arrow C, is formed by the outer flow path 23, and each flow path 64 between the corresponding adjacent two of the guide surfaces 63.

Thereby, in the high pressure pump 1 of the present embodiment, a cross-sectional area (opening area) of the entire flow path, which communicates between the supply passage 80 and the pressurizing chamber 100, can be increased. Therefore, it is possible to reduce the required lift amount of each of the valves (also referred to as valve elements) 40, 50, which is required to ensure the required amount of flow to be supplied to the pressurizing chamber 100.

In the state shown in FIG. 3, the high pressure pump 1 has a gap T between the bottom 53 of the step 51 of the outer valve 50 and the respective inner arm portions 42 of the inner valve 40. In this way, a force, which is exerted against the inner arm portions 42 of the inner valve 40 and the step 51 of the outer valve 50, is reduced. Furthermore, the collision impact of the step 51 of the outer valve 50 against the inner arm portions 42 at the time of rebounding of the outer valve 50 from the outer stopper 61 after contacting of the outer valve 50 to the outer stopper 61 can be reduced by the gap T. Therefore, in the high pressure pump 1, a circumferential width of each inner arm portion 42 can be reduced to increase a size of each flow path 43 formed between the corresponding adjacent two of the inner arm portions 42.

Next, the operation of the high pressure pump 1 will be described.

The high pressure pump 1 repeats an intake stroke, a metering stroke, and a discharging stroke to pressurize and discharge the required amount of fuel, which is required by the internal combustion engine.

(1) Intake Stroke

When the plunger 3 is lowered from a top dead center toward a bottom dead center through rotation of the camshaft, the volume of the pressurizing chamber 100 is increased, and thereby the pressure of the fuel in the pressurizing chamber 100 is decreased. The discharge valve 72 is seated against the discharge valve seat 76 to close a discharge passage 77.

The inner valve 40 and the outer valve 50 are moved toward the inner stopper 62 and the outer stopper 61, respectively, against the urging force of the second spring 68 and the urging force of the third spring 69 because of the differential pressure between the pressurizing chamber 100 and the supply passage 80, so that the inner valve 40 and the outer valve 50 are placed into the valve open state.

The movement of the inner valve 40 and the movement of the outer valve 50 from the valve closed state to the valve open state will be discussed with respect to FIGS. 7A to 7D.

FIG. 7A shows the valve closed state of the inner valve 40 and the valve closed state of the outer valve 50 at the time before starting of the intake stroke. At this time, the supply of the electric power to the coil 94 has been stopped since the middle of the discharging stroke, which takes place before the intake stroke. Therefore, the rod 30 urges the inner valve 40 with aid of the urging force of the first spring 95 toward the pump chamber 13. The inner valve 40 and the outer valve 50 contact the inner valve seat 24 and the outer valve seat 25, respectively, due to the differential pressure between the pressurizing chamber 100 and the supply passage 80 and the urging forces of the second and third springs 68, 69.

FIG. 7B shows a state, in which the inner arm portions 42 of the inner valve 40 contact the step 51 of the outer valve 50 due to the differential pressure between the pressurizing chamber 100 and the supply passage 80 and the urging force of the first spring 95 upon depressurization of the fuel in the pressurizing chamber 100 caused by the start of the intake stroke.

FIG. 7C shows a state, in which the inner valve 40 contact the inner stopper 62 upon movement of the inner valve 40 and the outer valve 50 toward the pump chamber 13 while the inner arm portions 42 of the inner valve 40 are urged against the step 51 of the outer valve 50.

FIG. 7D shows a state, in which the outer valve 50 contacts the outer stopper 61 due to the differential pressure between the pressurizing chamber 100 and the supply passage 80 and the dynamic pressure of the fuel, which flows from the supply passage 80 to the pressurizing chamber 100. In this state, the inner arm portions 42 of the inner valve 40 are spaced from the step 51 of the outer valve 50.

Since the inner valve 40 and the outer valve 50 are both opened, the fuel of the supply passage 80 flows through the flow paths, which are indicated by the arrows A, B, C in FIG. 3, and then the fuel is supplied into the pressurizing chamber 100 to compensate the pressure difference between the supply passage 80 and the pressurizing chamber 100.

(2) Metering Stroke

When the plunger 3 is moved upward from the bottom dead center toward the top dead center by the rotation of the camshaft, the volume of the pressurizing chamber 100 is decreased. At this time, the supply of the electric power to the coil 94 is stopped until predetermined timing. Therefore, the rod 30, which is urged by the urging force of the first spring 95, urges the inner valve 40 toward the pump chamber 13. Thus, as shown in FIG. 8A, the inner valve 40 and the outer valve 50 are both held in the valve open state. The step 51 of the outer valve 50 contacts the inner arm portions 42 of the inner valve 40 due to the pressure difference between the front side and the back side of the outer valve 50 and the urging force of the third spring 69.

Since the inner valve 40 and the outer valve 50 are both opened, the pressurizing chamber 100 and the supply passage 80 are kept to be communicated with each other. Thus, the low pressure fuel, which is once drawn into the pressurizing chamber 100, is returned to the supply passage 80. As a result, the pressure of the pressurizing chamber 100 is not increased.

When the electric power is supplied to the coil 94 at a predetermined time point in the middle of the movement of the plunger 3 from the bottom dead center to the top dead center, a magnetic attractive force is generated between the stationary core 92 and the moveable core 93 due to the presence of the magnetic field generated by the coil 94. When this magnetic attractive force becomes larger than a difference between the resultant force of the second and third springs 68, 69 and the resilient force of the first spring 95, the movable core 93 is moved toward the stationary core 92. In this way, as shown in FIG. 8B, the urging force of the rod 30 against the inner valve 40 is lost. Here, in a case where a moving velocity (speed) of the rod 30 is low, the inner valve 40 is moved in a valve closing direction (i.e., a direction toward the inner valve seat 24) while maintaining the contact between the inner valve 40 and the rod 30.

Thus, as shown in FIG. 8C, the inner valve 40 and the outer valve 50 are moved in the valve closing direction in conformity with the movement of the rod 30 due to the resilient forces of the second and third springs 68, 69, and the dynamic pressure of the low pressure fuel, which is discharged from the pressurizing chamber 100 to the damper chamber side. A distance between the outer valve 50 and the outer valve seat 25 is shorter than a distance between the inner valve 40 and the inner valve seat 24. Therefore, the outer valve 50 is seated against the outer valve seat 25 at first.

Thereafter, as shown in FIG. 8D, the inner valve 40 is seated against the inner valve seat 24. In this way, the outer flow path 23 and the inner flow path 22 are closed.

(3) Discharging Stroke

After the closing of both of the inner valve 40 and the outer valve 50, the fuel pressure of the pressurizing chamber 100 is increased in response to the upward movement of the plunger 3. When the force of the fuel pressure of the pressurizing chamber 100, which is applied to the discharge valve 72, becomes larger than the force of the fuel pressure applied from the fuel outlet 75 side to the discharge valve 72 and the urging force of the spring 73, the discharge valve 72 is opened, i.e., is lifted away from the discharge valve seat 76. In this way, the high pressure fuel, which is pressurized in the pressurizing chamber 100, is discharged from the fuel outlet 75.

In the middle of the discharging stroke, the supply of the electric power to the coil 94 is stopped. The force of the fuel pressure of the pressurizing chamber 100, which is applied to the inner valve 40 and the outer valve 50, is larger than the urging force of the first spring 95. Therefore, the inner valve 40 and the outer valve 50 are both kept in the valve closed state.

The high pressure pump 1 of the first embodiment provides the following advantages.

(1) In the first embodiment, the inner valve 40 is seatable and liftable relative to the inner valve seat 24, which is formed in the opening of the inner flow path 22 of the valve seat member 20, and the outer valve 50 is seatable and liftable relative to the outer valve seat 25, which is formed in the opening of the outer flow path 23 of the valve seat member 20.

With this construction, the effective sealing of the inner valve 40 and the effective sealing of the outer valve 50 at the valve closing time thereof can be maintained even in the case where the position of the inner valve seat 24 or the position of the outer valve seat 25 is changed due to, for example, the wearing that is induced by the temperature change of the high pressure pump 1 or the increase in the number of operations of the high pressure pump 1. Thus, the high pressure pump 1 can prevent the leakage of the pressurized fuel, which is pressurized in the pressurizing chamber 100, to the supply passage 80, so that the required pump efficiency of the high pressure pump 1 can be maintained.

Furthermore, in the high pressure pump 1, the passage cross-sectional area (the opening area) of the entire flow path, which communicates between the supply passage 80 and the pressurizing chamber 100, is increased by the inner flow path 22 and the outer flow path 23. Therefore, it is possible to reduce the required lift amount of each of the valves (the valve elements) 40, 50, which is required to ensure the required amount of flow to be supplied to the pressurizing chamber 100. When the lift amount is reduced, the acceleration time of each of the valves (the valve elements) 40, 50 is reduced. Thereby, the velocity of each of the valves (the valve elements) 40, 50 at the time of collision of the valve 40, 50 against the corresponding stopper 61, 62 or the corresponding valve seat 24, 25 is reduced. Here, the kinetic energy of the valve (the valve element) 40, 50 at the time of colliding of the valve (the valve element) 40, 50 against the stopper 61, 62 or the valve seat 24, 25 can be obtained with the following equation 1.

$$K = (1/2) \times mv^2 \qquad \text{Equation 1}$$

In the above equation 1, K denotes the kinetic energy of the valve 40, 50, and m denotes the mass of the valve 40, 50, and v denotes the velocity of the valve 40, 50.

Thus, in the high pressure pump 1, the required lift amount of each of the valves (the valve elements) 40, 50 is reduced to reduce the velocity v of the valve (the valve element) 40, 50. Thereby, the collision noise, which is generated at the time of collision between the valve (the valve element) 40, 50 and the stopper 61, 62 or the valve seat 24, 25, can be reduced.

(2) In the high pressure pump 1 of the first embodiment, when the inner valve 40 and the outer valve 50 are both closed, the gap S is formed between the step 51 of the outer valve 50 and the respective inner arm portions 42 of the inner valve 40.

Thereby, even in the case where the position of the inner valve seat 24 relative to the position of the outer valve seat 25 is shifted toward the fuel space 21, the inner valve 40 and the outer valve 50 can be seated against the inner valve seat 24 and the outer valve seat 25, respectively.

(3) In the first embodiment, the inner valve 40 includes the inner valve main body 41, which closes the inner flow path 22 at the time of seating the inner valve main body 41 against the inner valve seat 24, and the inner arm portions 42, which radially outwardly extend from the inner valve main body 41 and are contactable with the outer valve 50. Therefore, the flow path 43, which conducts the fuel, is formed between each adjacent two of the inner arm portions 42.

In this way, in the high pressure pump 1, when the inner valve 40 and the outer valve 50 are opened, the passage cross-sectional area (the opening area) of the flow path between the supply passage 80 and the pressurizing chamber 100 can be increased. Thus, in the high pressure pump 1, the moving distance of each of the valves (the valve elements) 40, 50 can be reduced, and the collision noise, which is generated at the time of collision between the valve (the valve element) 40, 50 and the stopper 61, 62 can be reduced.

(4) In the first embodiment, the inner stopper is contactable with the end surface of the inner valve, which is opposite from the rod. Thereby, at the time of valve opening of the inner valve 40 and the outer valve 50, the force, which is exerted against the inner arm portions 42 of the inner valve 40 and the step 51 of the outer valve 50, is reduced. Therefore, in the high pressure pump 1, the circumferential width of each inner arm portion 42 can be reduced to increase the size of each flow path 43 formed between the corresponding adjacent two of the inner arm portions 42.

(5) In the high pressure pump 1 of the first embodiment, when the outer valve 50 and the inner valve 40 contact the outer stopper 61 and the inner stopper 62, respectively, the space T is formed between the outer valve 50 and the inner valve 40.

Thereby, the collision impact of the step 51 of the outer valve 50 against the inner arm portions 42 at the time of rebounding of the outer valve 50 from the outer stopper 61 after contacting of the outer valve 50 to the outer stopper 61 can be reduced by the gap T. Therefore, in the high pressure pump 1, the circumferential width of each inner arm portion 42 can be reduced.

Second Embodiment

Figure 9:
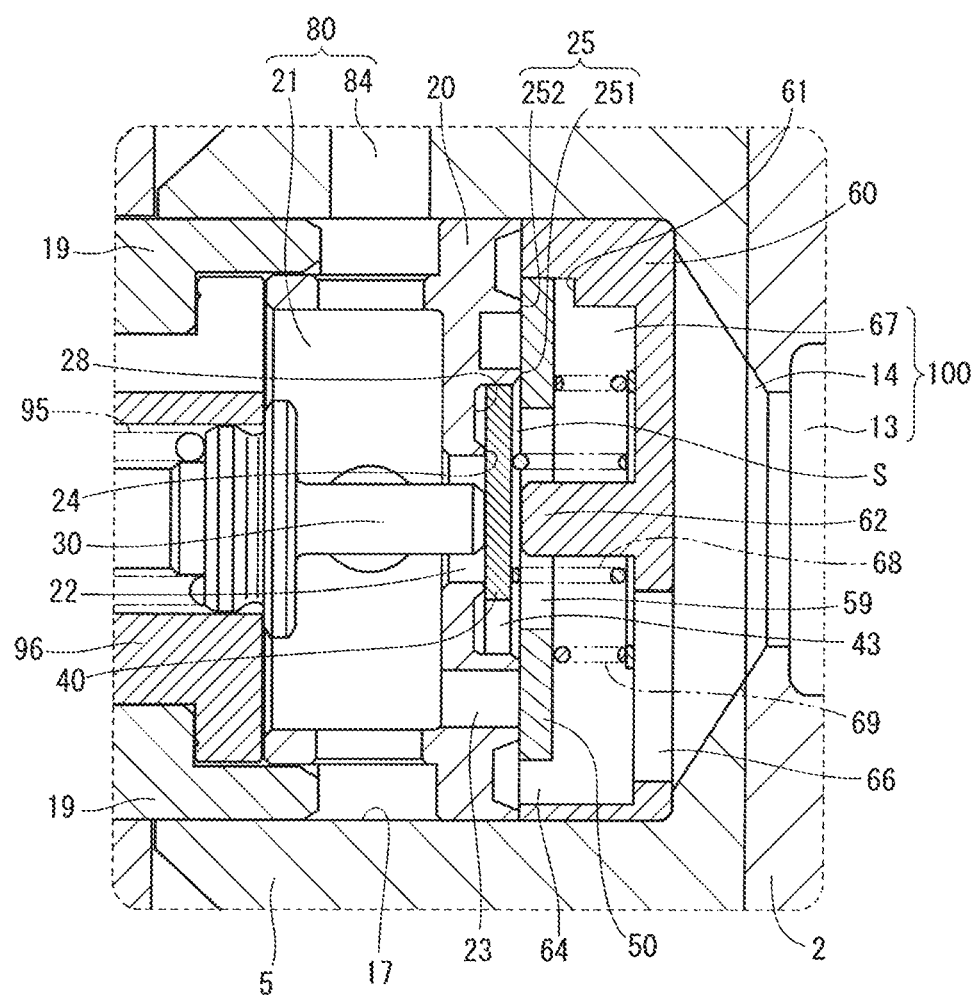
FIG. 9 is a schematic cross-sectional view of a high pressure pump according to a second embodiment of the present disclosure.
Figure 10:
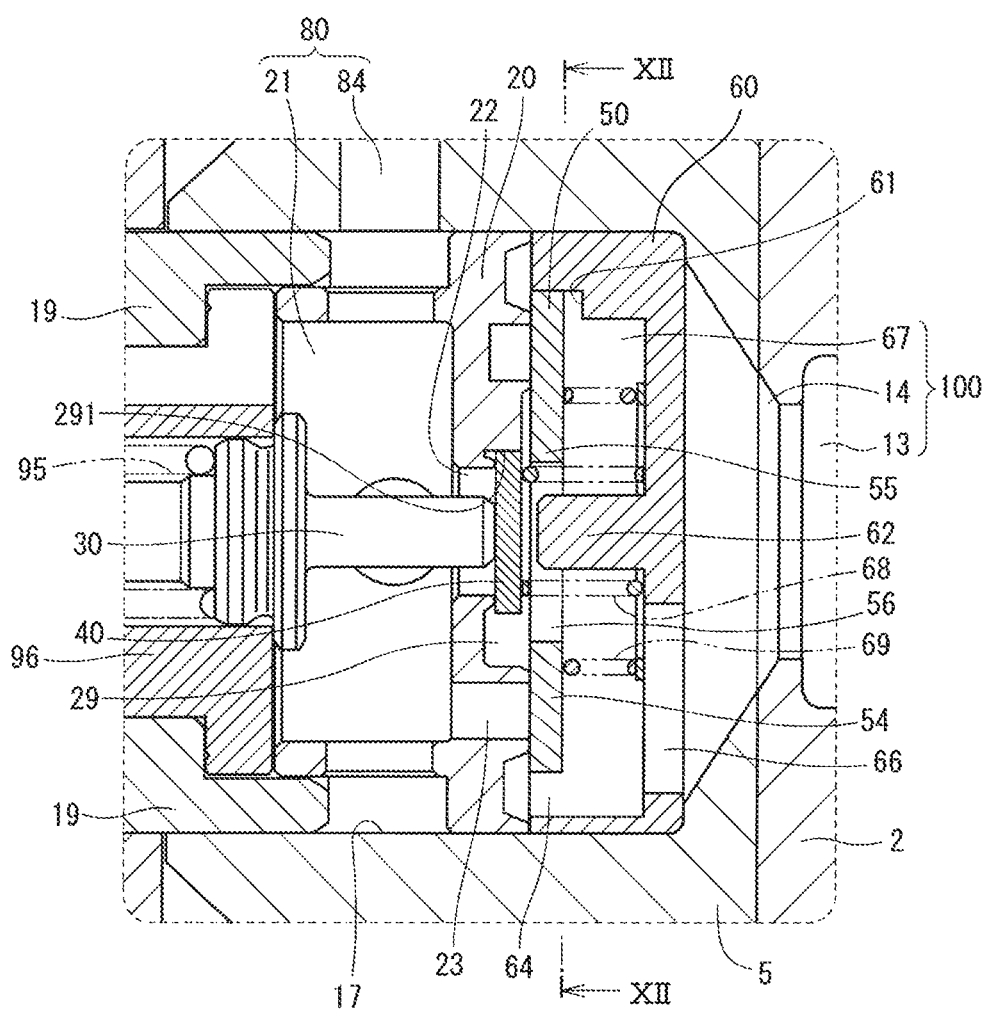
FIG. 10 is a schematic cross-sectional view of a high pressure pump according to a third embodiment of the present disclosure.

FIG. 9 shows a second embodiment of the present disclosure. In the second embodiment, the valve seat member 20 includes a recess 28 on the radially inner side of the outer valve seat 25. The inner flow path 22 opens in a bottom of the recess 28. The inner valve seat 24 is formed in the opening of the inner flow path 22. The inner valve 40 is received in the inside of the recess 28 in the valve closed state of the inner valve 40 and is axially guided by an inner peripheral wall (a radially inner wall) of the recess 28. Therefore, in the second embodiment, the outer valve 50 does not have the step discussed in the first embodiment.

As shown in FIG. 9, when the inner valve 40 and the outer valve 50 are seated against the inner valve seat 24 and the outer valve seat 25, respectively, the gap S is formed between the outer valve 50 and the respective inner arm portions 42 of the inner valve 40. Therefore, even in the case where the position of the inner valve seat 24 or the position of the outer valve seat 25 is changed, the inner valve 40 can be seated against the inner valve seat 24 to close the inner flow path 22, and the outer valve 50 can be seated against the outer valve seat 25 to close the outer flow path 23.

In the second embodiment, the valve seat member 20 includes the recess 28, which can receive the inner valve 40. The inner valve seat 24 is formed in the bottom of the recess 28.

Thereby, the structure of the outer valve 50 is simple without a need for providing the step in the outer valve 50, so that a thickness of the outer valve 50, which is measured in a direction perpendicular to a plane of the outer valve 50, can be reduced. Therefore, in the high pressure pump of the present embodiment, the mass m of the outer valve 50 is reduced, and thereby the kinetic energy E at the time of colliding of the outer valve 50 against the outer valve seat 25 or the outer stopper 61 can be reduced to reduce the collision noise.

Third Embodiment

FIGS. 10 to 13 show a third embodiment of the present disclosure. In the third embodiment, the inner valve 40 is configured into a circular disk form and does not include the inner arm portions 42.

The valve seat member 20 includes a plurality of flow paths 29, which are radially outwardly recessed from the recess 28. The inner valve 40 is axially guided by guide walls 291, each of which is formed between corresponding adjacent two of the flow paths 29 in the valve seat member 20.

The outer valve 50 includes an outer valve main body 54 and a plurality of outer arm portions 55. The outer valve main body 54 is configured into an annular form and closes the outer flow path 23 when the outer valve main body 54 is seated against the outer valve seat 25. The outer arm portions 55 radially inwardly extend from the outer valve main body 54. A flow path 56 is formed between each adjacent two of the outer arm portions 55. Radially inner end parts of the outer arm portions 55 overlap with the inner valve 40 in the axial direction and are contactable with the inner valve 40.

Figure 11:
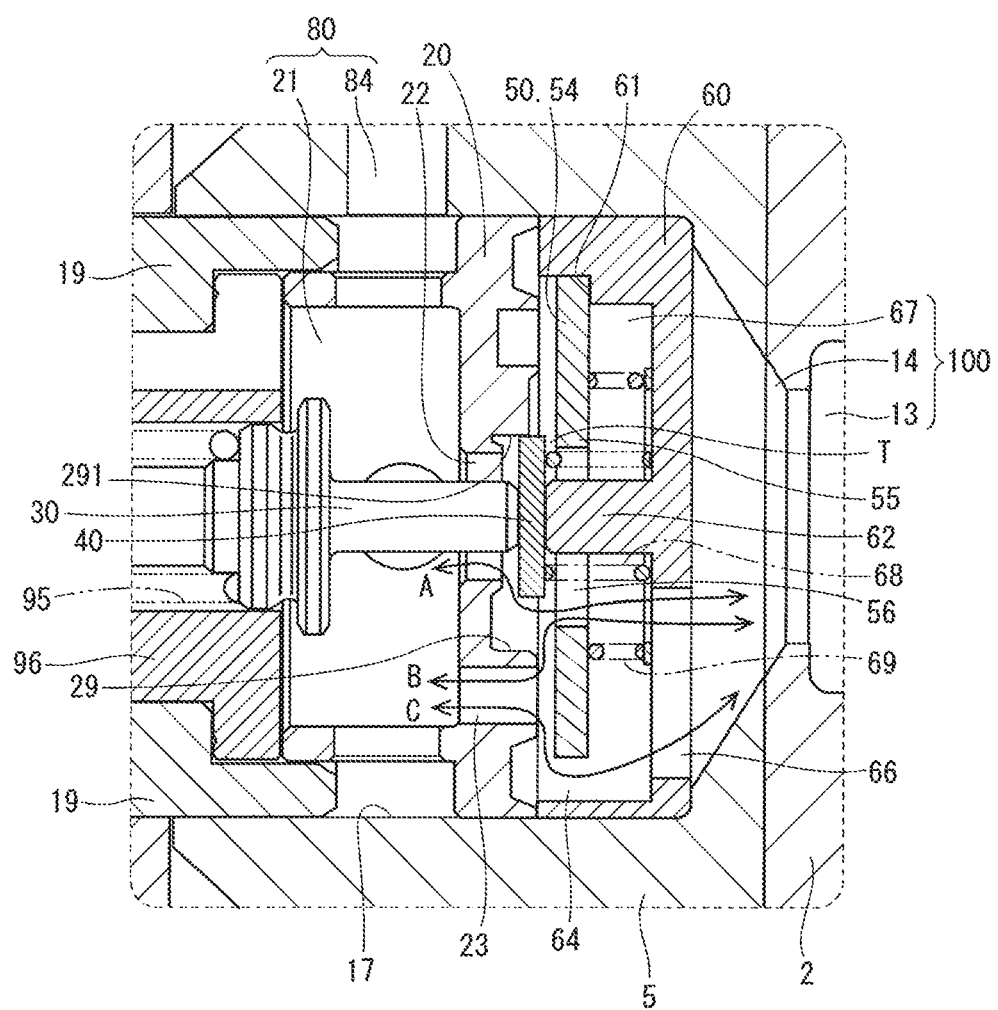
FIG. 11 is a cross-sectional view of a main feature of the high pressure pump of the third embodiment, showing a valve open state of an inner valve and a valve open state of an outer valve.
Figure 12:
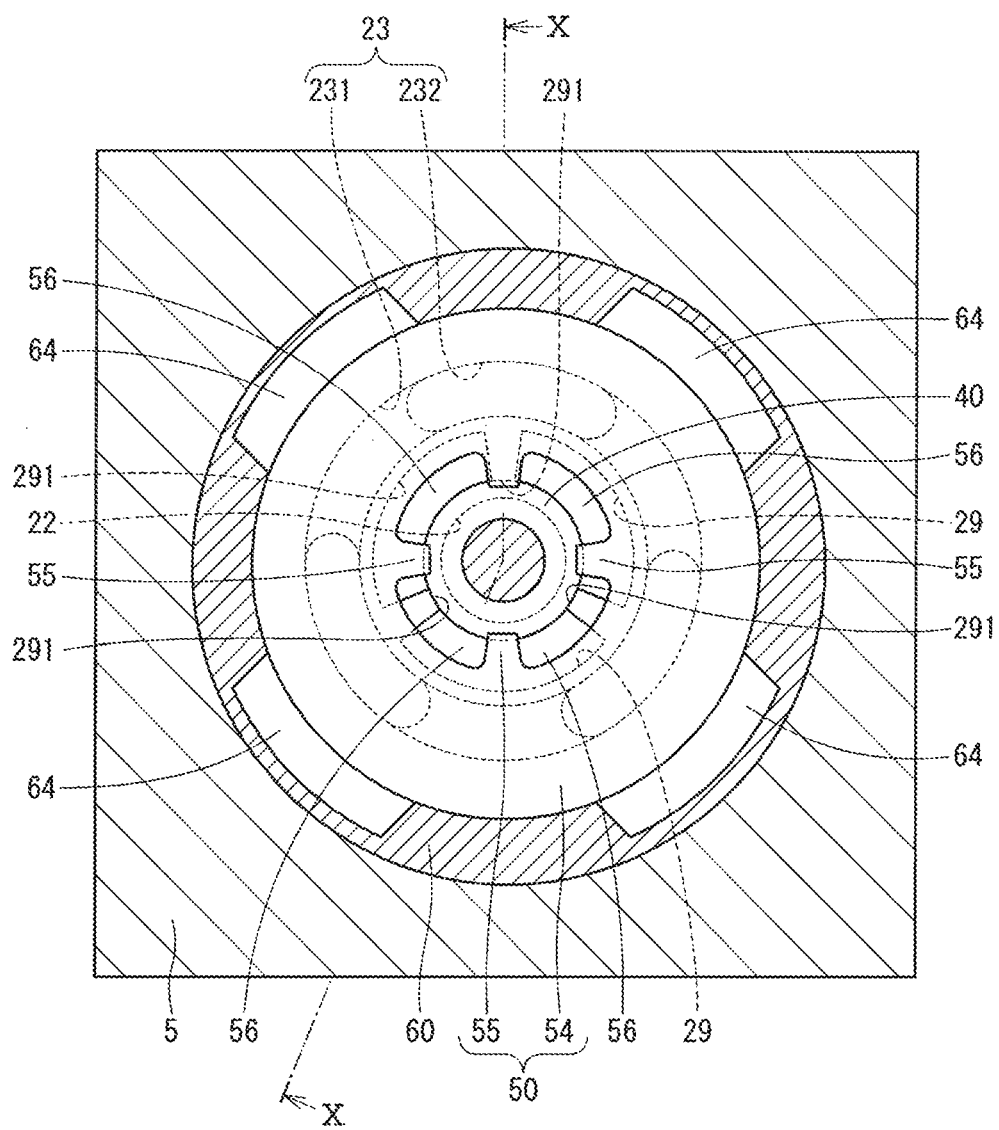
FIG. 12 is a cross-sectional view taken along line XII-XII in FIG. 10.
Figure 13:
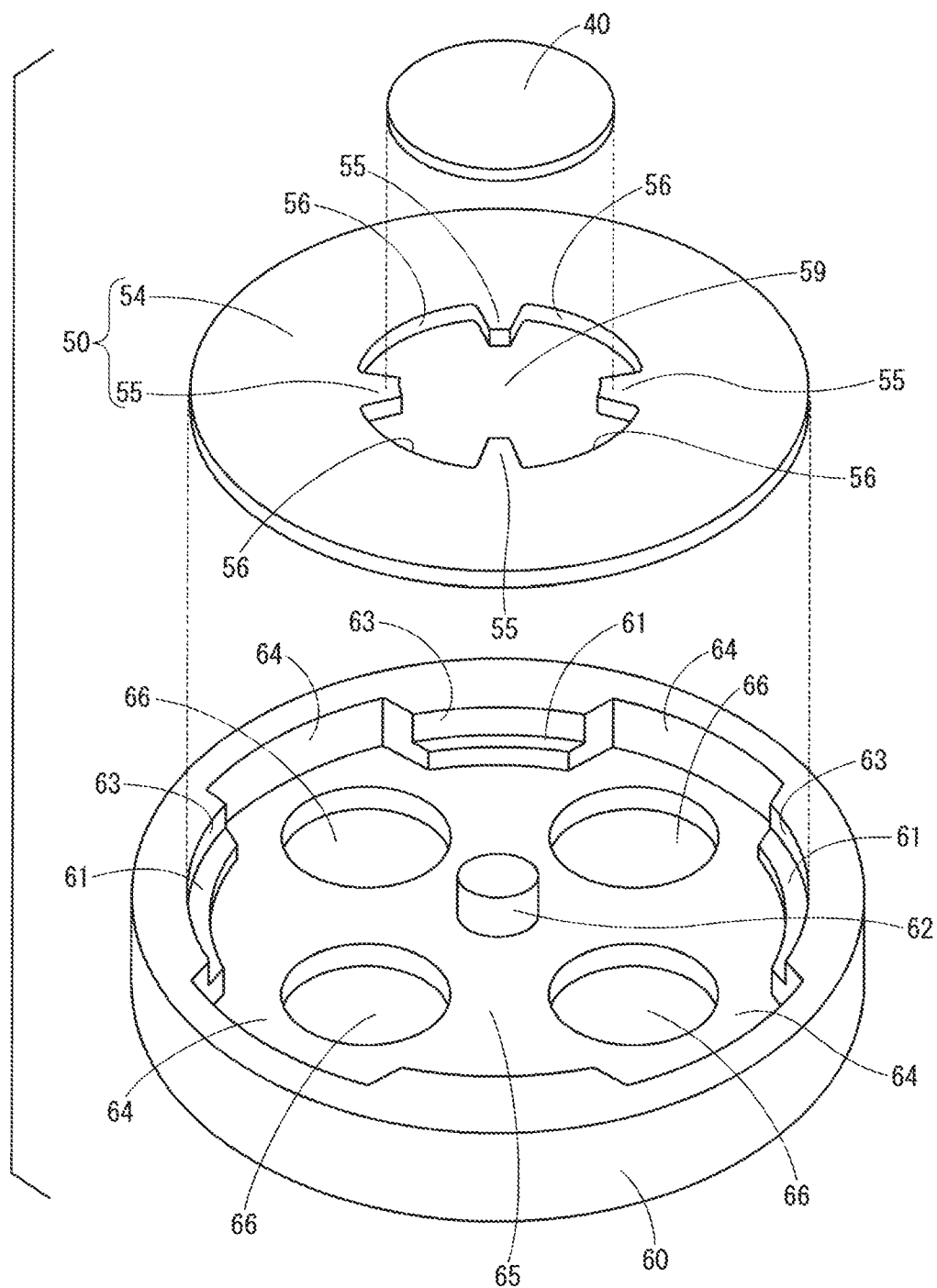
FIG. 13 is a perspective exploded view of the inner valve, the outer valve and a stopper member of the high pressure pump according to the third embodiment.

As shown in FIG. 11, in the high pressure pump 1, in the state where the inner valve 40 and the outer valve 50 contact the inner stopper 62 and the outer stopper 61, respectively, the gap T is formed between the inner valve 40 and the respective outer arm portions 55 of the outer valve 50. In this way, the force, which is exerted against the outer arm portions 55 of the outer valve 50, is reduced. Furthermore, the collision impact of the outer arm portions 55 of the outer valve 50 against the inner valve 40 at the time of rebounding of the outer valve 50 from the outer stopper 61 after contacting of the outer valve 50 to the outer stopper 61 can be reduced by the gap T. Therefore, in the high pressure pump, a circumferential width of each outer arm portion 55 can be reduced to increase a size of each flow path 56 formed between the corresponding adjacent two of the outer arm portions 55.

In the third embodiment, the inner valve 40 is configured into the circular disk form, so that the structure of the inner valve 40 is simplified.

Furthermore, in the third embodiment, the thickness of the inner valve 40, which is measured in the direction perpendicular to the plane of the inner valve 40, and the thickness of the outer valve 50, which is measured in the direction perpendicular to the plane of the outer valve 50, are reduced, so that the mass of the inner valve 40 and the mass of the outer valve 50 can be reduced. Thereby, the collision noise, which is generated by the collision between the outer valve 50 and the outer stopper 61 or the outer valve seat 25, can be reduced, and the collision noise, which is generated by the collision between the inner valve 40 and the inner stopper 62 or the inner valve seat 24, can be reduced.

Fourth Embodiment

Figure 14:
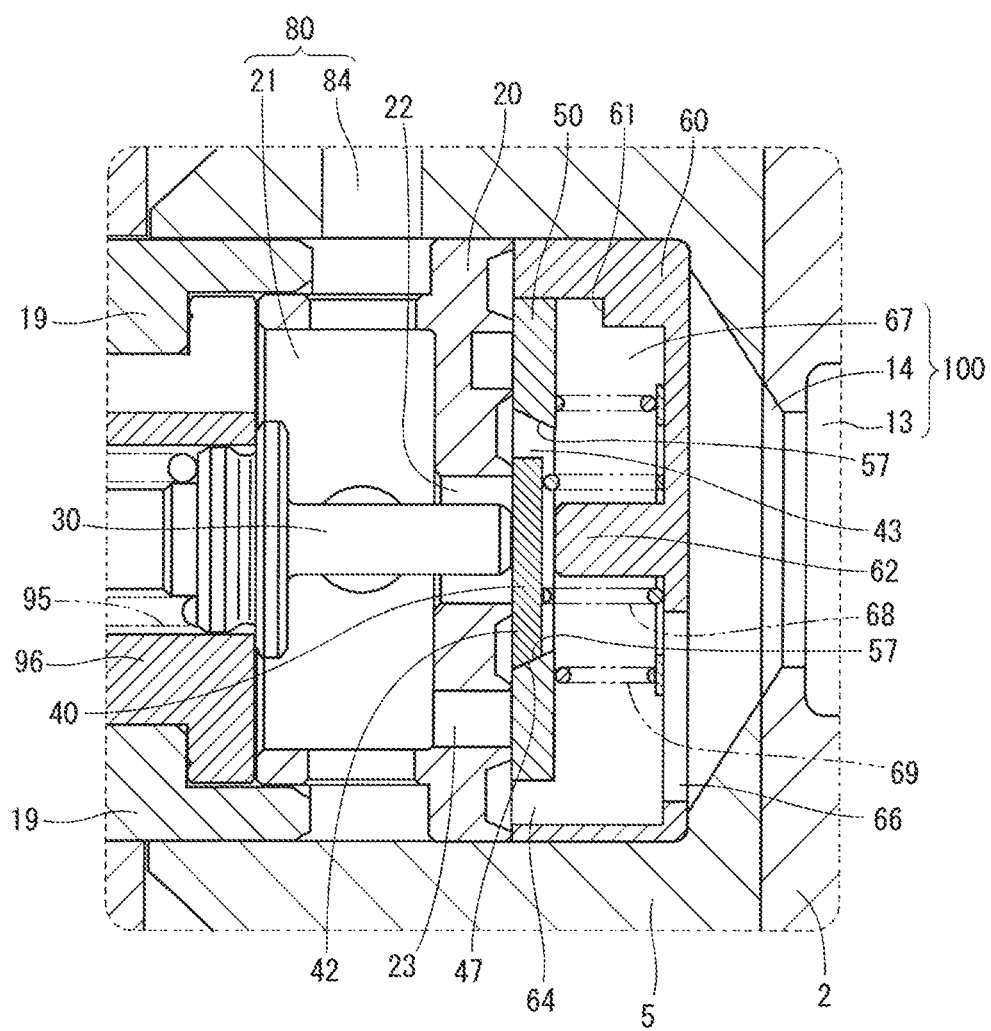
FIG. 14 is a schematic cross-sectional view of a high pressure pump according to a fourth embodiment of the present disclosure.

FIG. 14 shows a fourth embodiment of the present disclosure. In the fourth embodiment, a radially inner end surface (inner peripheral surface) 57 of the outer valve 50 is tapered to have a reducing inner diameter that is progressively reduced from one end part of the radially inner end surface 57, which is located on a side where the outer valve seat 25 is placed, to an opposite end part of the radially inner end surface 57, which is opposite from the outer valve seat 25. Furthermore, a radially outer end surface (outer peripheral surface) 47 of each inner arm portion 42 of the inner valve 40 is tapered to have a reducing outer diameter that is progressively reduced from one end part of the radially outer end surface 47, which is located on a side where the inner valve seat 24 is placed, to an opposite end part of the radially outer end surface 47, which is opposite from the inner valve seat 24. A taper angle of the radially inner end surface 57 of the outer valve 50 is generally equal to a taper angle of the radially outer end surface 47 of each inner arm portion 42 of the inner valve 40.

In the fourth embodiment, the rigidities of the radially outer end surface (serving as a contact part) 47 of the inner valve 40 and the radially inner end surface (serving as a contact part) 57 of the outer valve 50, which contact with each other, may be increased to enable a reduction in the thickness of the outer valve 50 and a reduction in the thickness of the inner valve 40. Therefore, in the high pressure pump, the mass of the outer valve 50 and the mass of the inner valve 40 are reduced. Thus, the collision noise between the outer valve 50 and the outer stopper 61 or the outer valve seat 25 and the collision noise between the inner valve 40 and the inner stopper 62 or the inner valve seat 24 can be reduced.

Fifth Embodiment

Figure 15:
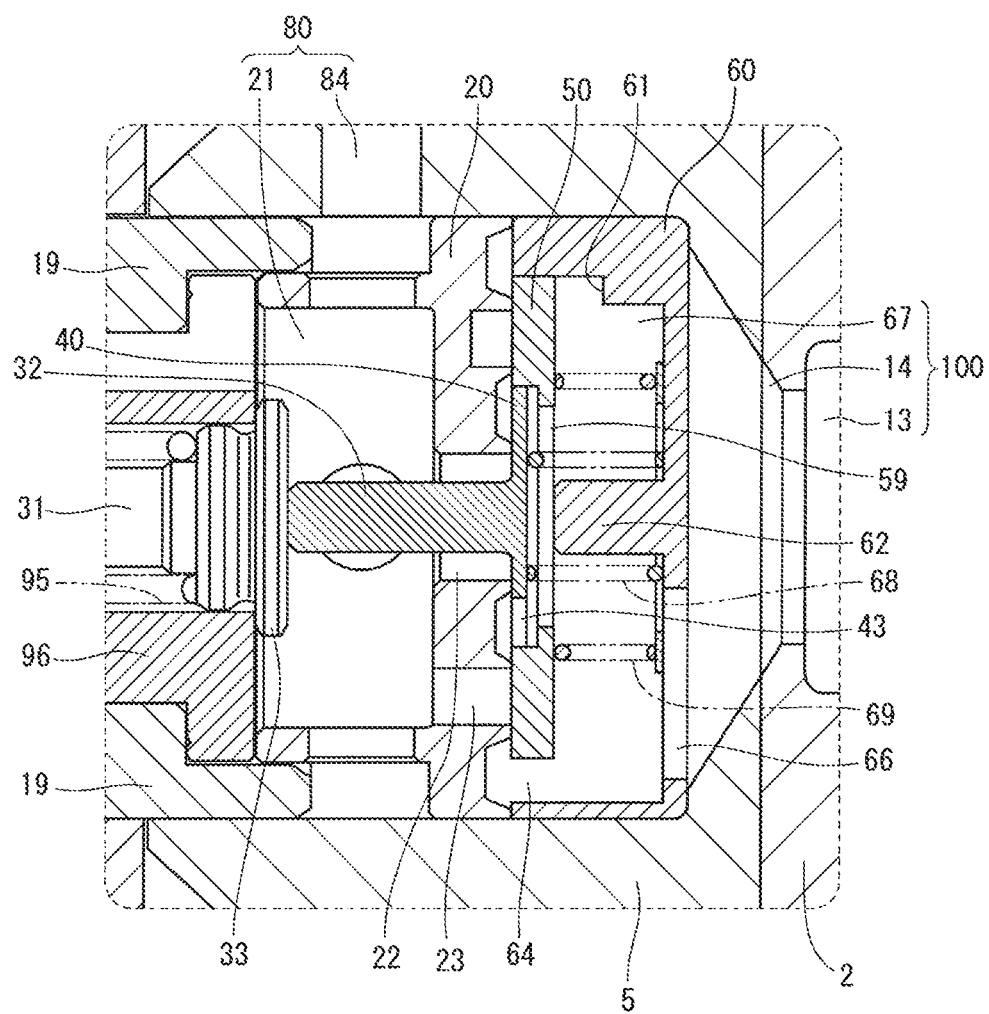
FIG. 15 is a schematic cross-sectional view of a high pressure pump according to a fifth embodiment of the present disclosure.

FIG. 15 shows a fifth embodiment of the present disclosure. In the fifth embodiment, the rod of the solenoid drive arrangement 9 includes a first rod 31 and a second rod 32. The first rod 31 is fixed to the movable core 93. The second rod 32 is coaxial with the first rod 31. The second rod 32 is formed integrally with the inner valve 40. More specifically, in this embodiment, the second rod 32 is formed seamlessly and integrally with the inner valve 40 as a one-piece body.

In the fifth embodiment, the mass of the first rod 31 of the solenoid drive arrangement 9 is smaller than the mass of the rod 30 of the first to fourth embodiments. Therefore, the collision noise between the movable core 93 and the stationary core 92 or the guide member 96 or the collision noise between a flange portion 33 of the first rod 31 and the guide member 96 can be reduced. The solenoid drive arrangement 9 is placed on an outer side of the inner valve seat 24 where the atmosphere side of the high pressure pump is located. Therefore, it is effective to reduce the noise of the high pressure pump.

Sixth Embodiment

Figure 16:
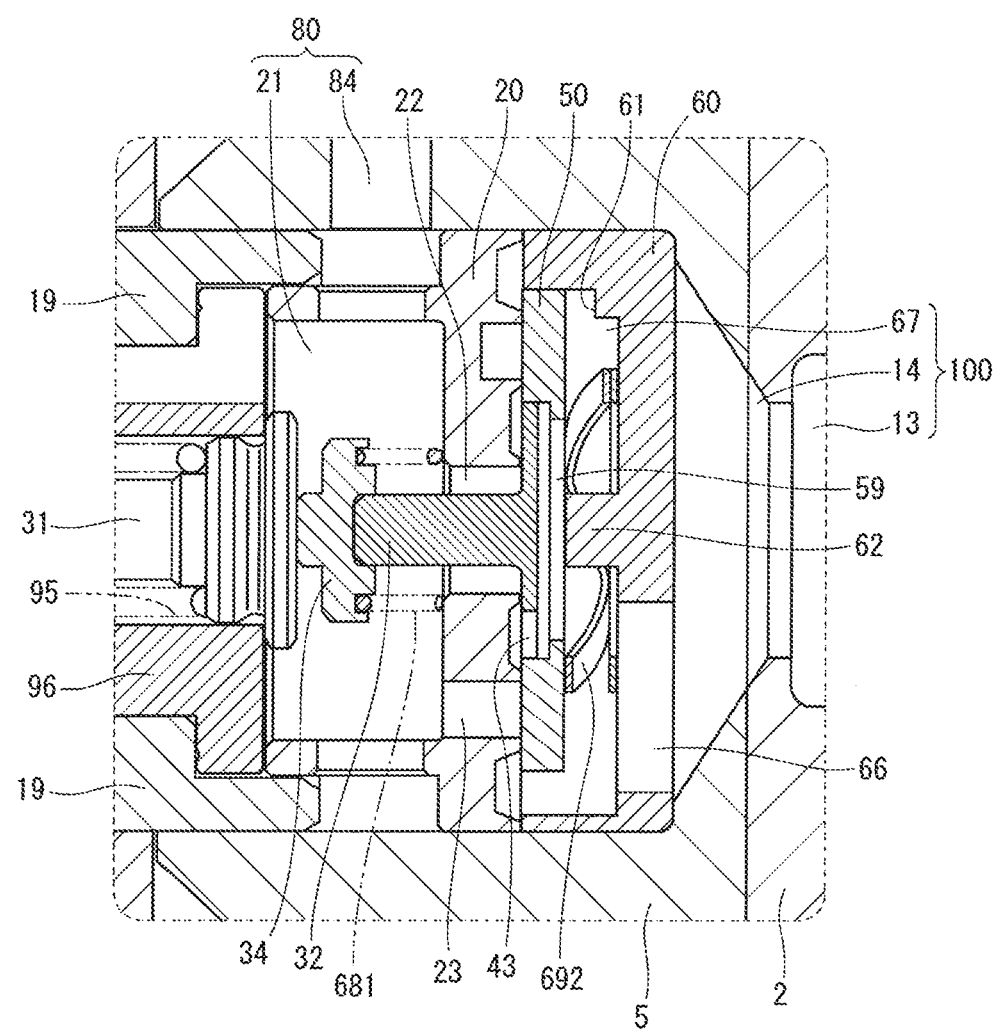
FIG. 16 is a schematic cross-sectional view of a high pressure pump according to a sixth embodiment of the present disclosure.

FIG. 16 shows a sixth embodiment of the present disclosure. In the sixth embodiment, a seat 34 is fixed to an end part of the second rod 32, which is located on a side where the first rod 31 is placed. The second rod 32 and the seat 34 are fixed to each other by, for example, press fitting or welding.

A second spring 681, which urges the inner valve 40 against the inner valve seat 24, is placed between the valve seat member 20 and the seat 34.

A third spring 692, which urges the outer valve 50 against the outer valve seat 25, is a wave washer.

In the sixth embodiment, the second spring 681 is not placed in the space 67, which is formed in the inside of the stopper member 60. Furthermore, the third spring 692, which is placed in the space 67 in the inside of the stopper member 60, can be made of the wave washer instead of the coil spring. Therefore, the space 67 in the inside of the stopper member 60 can be reduced to reduce the size of the stopper member 60. Thereby, the size of the high pressure pump can be reduced.

Now, modifications of the above embodiments will be described.

In the above embodiments, the lift amount of the inner valve at the valve opening time of the inner valve is limited by the inner stopper, and the lift amount of the outer valve at the valve opening time of the outer valve is limited by the outer stopper. In contrast, in a modification of the above embodiments, the inner stopper and the outer stopper may be eliminated. In such a case, the lift amount of the inner valve at the valve opening time of the inner valve may be limited by the second spring, and the lift amount of the outer valve at the valve opening time of the outer valve may be limited by the third spring. In such a case, the second spring and the third spring serve as the movement limiting devices, respectively.

In the above embodiments, the inner stopper 62, which extends from the bottom wall 65, is formed in the stopper member 60. Alternatively, in a modification of the above embodiments, the inner stopper is eliminated from the stopper member 60. In such a case, the rigidity of the inner arm portions 42 may be increased, and the bottom 53 of the step 51 of the outer valve 50 may be used as an inner stopper.

The present disclosure is not limited to the above embodiments, and the above embodiments may be further modified according to the principle of the present disclosure. For example, any one or more of the above components of any one of the above embodiments may be combined with any one or more of the above components of any other one or more of the above embodiments.

What is claimed is:

1. A high pressure pump comprising:
 a plunger that is reciprocatable;
 a pump body that includes:
  a pressurizing chamber, in which fuel is pressurized through reciprocation of the plunger; and
  a supply passage, which supplies the fuel to the pressurizing chamber;
 a valve seat member that partitions between the supply passage and the pressurizing chamber, wherein the valve seat member includes:
  an inner flow path, which communicates between the supply passage and the pressurizing chamber; and
  an outer flow path, which is placed on a radially outer side of the inner flow path and communicates between the supply passage and the pressurizing chamber;
 a valve member that has a cylindrical outer peripheral surface and is seatable and liftable relative to the valve seat member, wherein:
  in one operational state where the valve member is seated against the valve seat member, communication between the supply passage and the pressurizing chamber through the inner flow path and the outer flow path of the valve seat member is disabled; and
  in another operational state where the valve member is lifted away from the valve seat member, the communication between the supply passage and the pressurizing chamber through the inner flow path and the outer flow path of the valve seat member is enabled;
 a stopper member that is formed separately from the valve seat member and is placed on a side of the valve seat member, at which the pressurizing chamber is placed, and the valve member is placed between the valve seat member and the stopper member, wherein:
  the stopper member includes a stopper, which limits a lift amount of the valve member at a time of lifting the valve member away from the valve seat member;
  the cylindrical outer peripheral surface of the valve member is slidably guided by a plurality of guide surfaces of the stopper member when the valve member is reciprocated between the valve seat member and the stopper of the stopper member, and each of the plurality of guide surfaces is formed as an inner peripheral surface of a corresponding one of a plurality of radial projections, which radially inwardly project from a peripheral wall of the stopper member; and the valve member defines an outer flow path, which is located between the valve member and the stopper member in a radial direction of the valve member, and an inner flow path, which is located on a radially inner side of the outer flow path defined by the valve member; and a rod that is received through the inner flow path of the valve seat member and controls movement of the valve member.

2. The high pressure pump according to claim 1, wherein the stopper is one of a plurality of stoppers, which are discontinuously formed one after another in a circumferential direction in the stopper member.

3. The high pressure pump according to claim 1, wherein:
the outer flow path, which is defined by the valve member, is one of a plurality of outer flow paths, which are located between the valve member and the stopper member in the radial direction and are arranged one after another in a circumferential direction; and each of the plurality of outer flow paths, which are located between the valve member and the stopper member in the radial direction, is interposed between corresponding adjacent two of the plurality of radial projections in the circumferential direction.

4. The high pressure pump according to claim 2, wherein each of the plurality of guide surfaces is placed on a radially outer side of a corresponding one of the plurality of stoppers.

5. The high pressure pump according to claim 1, wherein the stopper member includes a communication path which extends through a bottom wall of the stopper member.

6. The high pressure pump according to claim 1, wherein the plurality of radial projections is arranged one after another in a circumferential direction.

* * * * *